United States Patent [19]

Benson et al.

[11] Patent Number: 4,755,197

[45] Date of Patent: Jul. 5, 1988

[54] TORQUE TRANSMITTING DEAERATING APPARATUS

[75] Inventors: Victor N. Benson; James R. Easter; Wayne A. Flygare, all of Rockford, Ill.

[73] Assignee: Sundstrand Corporation, Rockford, Ill.

[21] Appl. No.: 812,905

[22] Filed: Dec. 23, 1985

[51] Int. Cl.⁴ .............................................. B01D 19/00
[52] U.S. Cl. ...................................... 55/182; 55/203; 55/409
[58] Field of Search ................. 55/182, 203, 201, 199, 55/409, 422

[56] References Cited

U.S. PATENT DOCUMENTS

| | | |
|---|---|---|
| 2,402,398 | 6/1946 | Harpster . |
| 2,725,956 | 12/1955 | Cunningham . |
| 3,031,974 | 5/1962 | Edwards . |
| 3,300,950 | 1/1967 | Carle ..................................... 55/199 |
| 3,378,104 | 4/1968 | Venable ........................... 55/182 X |
| 3,670,850 | 6/1972 | Swearingen . |
| 3,686,831 | 8/1972 | Libby .................................... 55/199 |
| 4,093,428 | 6/1978 | Swogger ......................... 55/182 X |
| 4,197,097 | 4/1980 | Magorien et al. ............... 55/182 X |
| 4,217,120 | 8/1980 | Reynolds ......................... 55/409 X |
| 4,222,751 | 9/1980 | Shunta ............................. 55/182 X |
| 4,324,569 | 4/1982 | Klimczak ............................. 55/182 |
| 4,561,867 | 12/1985 | Charbonnel ................... 55/203 X |
| 4,600,413 | 7/1986 | Sugden ............................ 55/409 X |

FOREIGN PATENT DOCUMENTS 466028  6/1975  U.S.S.R. ................................ 55/182

Primary Examiner—Kathleen J. Prunner
Attorney, Agent, or Firm—Wood, Dalton, Phillips, Mason & Rowe

[57] ABSTRACT

A torque transmitting apparatus which includes a tubular drive shaft defining a deaeration chamber integral with the interior of the shaft. Aerated liquid is ducted into one axial end of the deaeration chamber and separated air and residual liquid are ducted from the opposite end of the chamber, generally near the center thereof. Relative rapid rotation of the drive shaft causes radial acceleration of the liquid to effect separation of the more dense liquid from the air under the influence of centrifugal force. The deaerated liquid is ported from the outer periphery of the chamber during rotation of the drive shaft.

13 Claims, 1 Drawing Sheet

TORQUE TRANSMITTING DEAERATING APPARATUS

DESCRIPTION

FIELD OF THE INVENTION

This invention relates to gas separators and, particularly, to a novel centrifugal deaerating device incorporated in a torque transmitting apparatus.

BACKGROUND OF THE INVENTION

There are a wide variety of devices designed for separating gas or air from a liquid or other medium more viscous or dense than the air. Such deaerating devices are used in countless applications from liquid or fuel pumps to water or oil well applications.

One area of concern is in components of modern aircraft accessories, such as hydraulic units, which are adversely affected in function and longevity by air entrained in the oil supply. For instance, the oil may be used as a coolant in integrated drive generators or other components which can be damaged or rendered less efficient by air entrained in the more viscous coolant.

Such problems commonly are addressed by the use of a deaerator to reduce the air content of the applicable fluid. Deaerators may have static or dynamic designs. Static deaerators, when sized to perform their prescribed function, occupy considerable space and add considerable weight which in many applications, such as aircraft applications, is undesirable. Dynamic deaerators most often include rotating impellers for effecting radial acceleration of the aerated liquid which causes separation of the more dense liquid from the air under the influence of centrifugal force. Dynamic or rotating deaerators weigh less and occupy less space than static deaerators, but the incorporation of rotating impellers, associated bearings and other related elements, add cost and complexity to the deaerator design and still add undesirable weight, particularly for aircraft applications. Rotating deaerators, necessarily incorporating movable components, present reliability and maintenance problems. Furthermore, rotating impeller-type deaerators impose constraints on the design envelope and the shaft speed of the design.

This invention is directed to providing a novel deaerator design which solves most if not all of the above problems. The deaerator of this invention is cost effective, extremely simple, reliable and presents no constraint on shaft speed of the particular apparatus. In fact, the deaerator does not even include movable components.

SUMMARY OF THE INVENTION

An object, therefore, of the invention is to provide a new and improved deaerating means.

Another object of the invention is to provide a torque transmitting apparatus which includes the deaerating means directly within the torque transmitting component without additional moving parts.

In the exemplary embodiment of the invention, a deaerating system is incorporated in a torque transmitting apparatus. Drive shaft means are provided with at least a portion of the drive shaft defining a torque tube. The torque tube defines an annular deaeration chamber within which air is separated from liquid by relatively rapid rotation of the drive shaft means and torque tube itself.

More particularly, annular wall means project radially inwardly at axially spaced locations within the torque tube portion of the drive shaft means to define an integral, internal deaeration chamber. Opposed port means are located generally centrally of the axially spaced wall means to define means for ducting aerated liquid into the chamber at one axial end of the chamber and means for ducting separated air from the chamber at the opposite axial end of the chamber. Port means are provided in the outer walls of the torque tube portion of the drive shaft means, between the axially spaced wall means, for ducting deaerated liquid from the chamber. Conduit means are provided axially through the drive shaft means in communication with the port means for delivering aerated liquid to the deaeration chamber.

With the above integral deaerating means, relatively rapid rotation of the drive shaft means and its torque tube portion causes radial acceleration of the liquid in the deaeration chamber. The radial acceleration of the liquid effects radially outward separation of the liquid from the air under the influence of centrifugal force. Therefore, it can be seen that an effective deaeration system is provided integral with the drive shaft or torque tube and does not require any additional moving components, such as separate rotating impellers. This construction drastically reduces the weight and complexity of rotating deaerators heretofore incorporated as an accessory with the torque transmitting apparatus. Since there are no movable parts, the reliability of the deaerating system of this invention is remarkable, and the design imposes no constraints on the envelope of the apparatus or the speed of the drive shaft means.

The drive shaft means and/or torque tube can be connected directly to a machine, such as a generator, which utilizes a liquid medium, such as for cooling purposes. The fluid can be channeled directly from the machine through the drive shaft means and integral deaerating chamber, with the aerated fluid ported back into the system and the separated air and residual liquid ported back to a sump.

Another configuration of the invention contemplates incorporating the integral deaeration chamber into a disconnect shaft.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
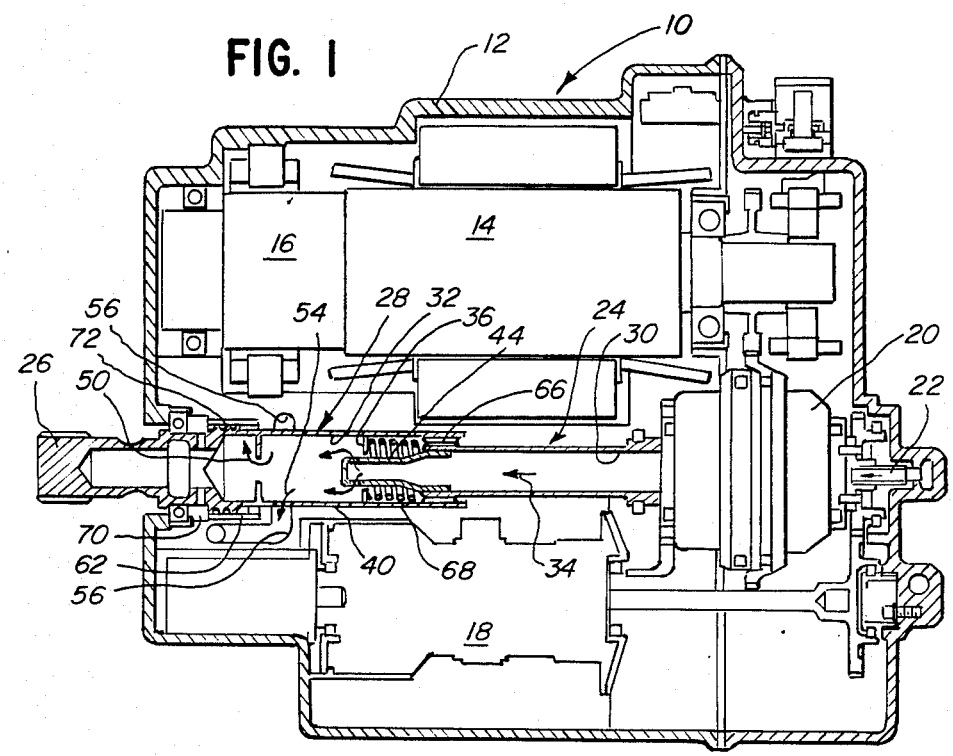
FIG. 1 is an axial section through an integrated drive generator incorporating the deaerating system of this invention.

Referring to the drawings in greater detail, and first to FIG. 1, an integrated drive generator, generally designated 10, is somewhat schematically illustrated, with an axial section through a housing 12 of the generator. Briefly, apparatus 10 includes a main generator 14, an exciter 16, and a hydraulic log 18. A differential drive 20 is mounted within housing 12 and receives fluid, such as a coolant, through a conduit 22 which is ducted to an appropriate fluid supply source. In conventional apparatus, such as integrated drive generator 10, after the cooling liquid passes through differential 20, additional porting is required to deliver the liquid back to the sump. In addition, a separate deaerating device must be incorporated within the liquid flow system before the liquid or coolant is returned back to the differential. Of course, deaeration of such liquids may be required in other components of an aircraft, for instance, where a drive is required.

Drive shaft means, generally designated 24, are operatively coupled to differential 20. The drive shaft means has a spline coupling 26 on the distal end thereof outside housing 12 for connection to an appropriate source of driving power. The invention contemplates a novel deaerating sytem which incorporates deaerating means, generally designated 28, as an integral design with drive shaft means 24 without requiring any independent movable parts. As will be apparent hereinafter, such a design not only eliminates the need for a separate deaerator apparatus, as well as the housing bearings and supports for the separate deaerator, but the complex fluid port coring necessary for a separate deaerator within the housing 12 is completely eliminated. Drive shaft means 24, in essence, performs a dual function as a drive shaft and a deaerator located coaxially with differential 20. This considerably reduces the weight of integrated drive generator 10, along with the size requirements necessary for a separate deaerator accessory and its related structural components.

Figure 2:
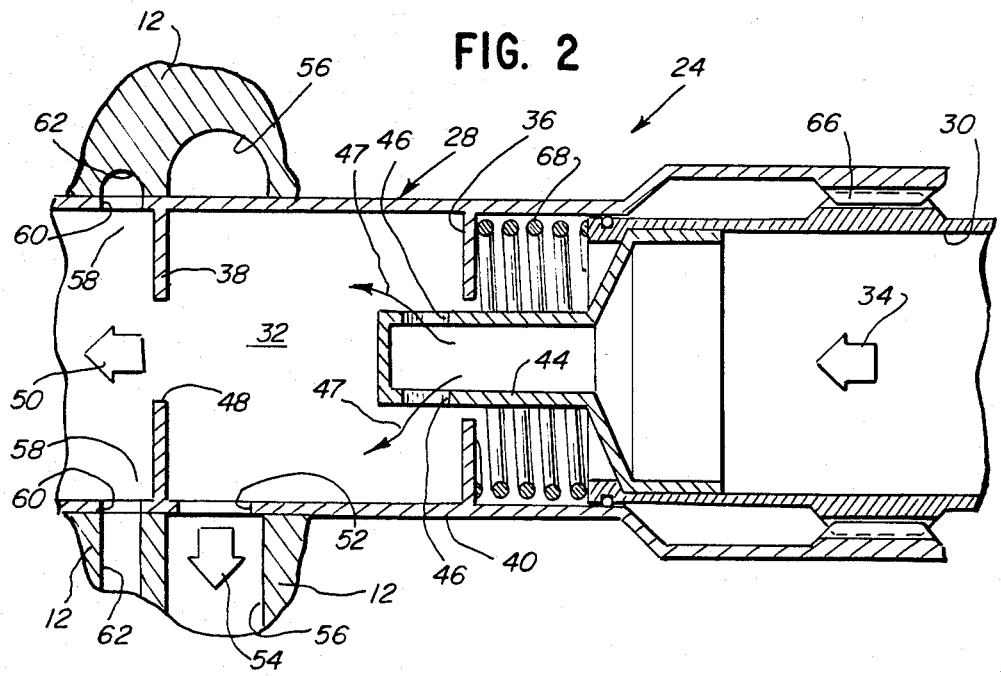
FIG. 2 is a central, axial section, on an enlarged scale, of the integral deaerating means in the drive shaft or torque tube of the apparatus shown in FIG. 1.

More particularly, referring to FIG. 2 in addition to FIG. 1, drive shaft means 24 can be seen to be designed as a torque tube having a conduit portion 30 and a deaeration chamber portion 32 extending coaxially away from differential 20. Briefly, conduit 30 delivers aerated coolant or liquid directly from differential 20 in the direction of arrows 34. The aerated liquid is delivered to deaeration chamber 32. Since drive shaft means 24 rotates at a relatively rapid speed, the aerated liquid delivered to deaeration chamber 32 is caused to radially accelerate to effect radially outward separation of the more dense liquid from the air under the influence of centrifugal force. As will be described in greater detail hereinafter, the deaerated liquid is ducted back into the pump system and the separated air and residual liquid is ducted to a sump.

The torque transmitting deaerating system of the invention is best illustrated in the enlargement of FIG. 2. Specifically, deaeration chamber 32 is defined axially by spaced annular walls 36 and 38 which project radially inwardly from a cylindrical wall 40 of the torque tube or drive shaft. In essence, the annular walls define circular weirs at opposite ends of deaeration chamber 32. Therefore, the deaeration chamber is formed integrally with the interior of the drive shaft means.

Port means are defined at the upstream end of deaeration chamber 32 by a reduced diameter portion 44 of the drive shaft means, the reduced diameter portion 44 having radial ports 46. Therefore, aerated liquid is directed from differential 20, through conduit 30 in the direction of arrow 34, and outwardly through ports 46 in the direction of arrows 47 into deaeration chamber 32 generally centrally thereof.

A port 48 is formed in wall 38 at the opposite end of deaeration chamber 32 for the passage therethrough of separated air and any residual liquid, in the direction of arrow 50.

The liquid and air are segregated within deaeration chamber 32 by the radial acceleration imposed thereon by the relatively rapid rotation of the torque tube or drive shaft means 24. The most dense and, therefore, most deaerated liquid will be biased toward the outside of deaeration chamber 32 against the peripheral walls 40 of the chamber under the influence of centrifugal force.

A port 52 is formed in peripheral wall 40 of deaeration chamber 32 between axially spaced walls 36,38 for ducting deaerated liquid from chamber 32. The deaerated liquid is forced in the direction of arrow 54 into an annular core 56 in housing 12 and ducted therefrom to a pump or other component for recirculation.

Air and residual liquid that passes through port 48 in wall 38 of the deaeration chamber is exhausted radially outwardly in the direction of arrows 58 through ports 60 in the torque tube and into coring 62 in housing 12 whereupon the air and residual oil is ducted to a sump.

Another feature of the invention contemplates incorporating the integral deaeration chamber into a disconnect mechanism to the drive shaft. This is shown in FIGS. 1 and 2 wherein the outer distal end of the conduit portion 30 of drive shaft means 24 is splined, as at 66, to the inner end of the deaeration chamber portion 32 of the drive shaft means connected to differential 20. A coil spring 68 is provided between the two portions. Spline coupling 26, which is connected to an appropriate source of driving power, in turn is disengagingly coupled to drive shaft means 24 by jaw clutch teeth 70. A worm gear portion 72 is provided on the outer distal end of drive shaft means 24, immediately adjacent the jaw clutch. A selectively actuable plunger (not shown) is mounted in housing 12 for movement radially of the drive shaft means. The plunger has gear teeth for engaging worm gear portion 72. The plunger may be remotely actuated, as by a solenoid controlled from the cockpit of an aircraft. When the toothed plunger is actuated to mate with worm gear portion 72, rotation of spline coupling 26 causes deaeration chamber portion 32 to move axially inwardly, through the action of the worm gear portion, against the biasing of spring 68. This axial movement disengages jaw clutch teeth 70 and effectively disconnects drive shaft means 24 and the deaeration chamber, on command.

From the foregoing, it can be seen that the deaerated liquid is separated from entrained air or gas within deaeration chamber 32, the deaerated liquid being exhausted from the chamber back into system, and the separated air and residual liquid ducted to sump without a single movable part such as rotating impellers required with separate deaerating devices of the prior art. In essence, torque tube or drive shaft means 24 performs a dual function as a drive shaft and a deaerating system.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a torque transmitting apparatus, deaerating means comprising elongated drive shaft means for transmitting power to a machine, gearbox or the like from an appropriate power source, at least a portion of said drive shaft means comprising a torque tube with a tubular wall defining a deaeration chamber directly within the drive shaft means remote from the machine, means for ducting aerated liquid into the deaeraton chamber whereby relatively rapidly rotation of the drive shaft means causes radial acceleration of the liquid to effect radially outward separation of the liquid from the air under the influence of centrifugal force, means located near an outer periphery of the chamber for ducting deaerated liquid herefrom, and means located inwardly of the outer periphery of the chamber for ducting separated air from the chamber.

2. In a torque transmitting apparatus as set forth in claim 1, wherein said means for ducting aerated liquid into the deaeration chamber include conduit means disposed axially through the shaft means and in communication with the chamber.

3. In a torque transmitting apparatus as set forth in claim 2, wherein said means for ducting deaerated liquid from the deaeration chamber include port means through the outer periphery of the chamber.

4. In a torque transmitting apparatus as set forth in claim 2, including generally centrally located port means through one end of the chamber in communication with said conduit means.

5. In a torque transmitting apparatus as set forth in claim 4, wherein said means for ducting separated air from the chamber include generally centrally located port means at an end opposite said one end of the chamber.

6. In a torque transmitting apparatus as set forth in claim 5, wherein said means for ducting deaerated liquid from the deaeration chamber include port means through the outer periphery of the chamber.

7. In a torque transmitting apparatus as set forth in claim 1, wherein said deaeration chamber is defined by radially inwardly projecting, annular wall means spaced axially of the drive shaft.

8. In a torque transmitting apparatus as set forth in claim 7, wherein said wall means have opposed, generally centrally located port means at opposite ends of the deaeration chamber defining said means for ducting aerated liquid into the chamber and said means for ducting separated air from the chamber.

9. In a torque transmitting apparatus as set forth in claim 8, wherein said means for ducting deaerated liquid from the dearation chamber include port means through the outer periphery of the chamber.

10. A deaerating system in a torque transmitting apparatus, comprising:
    elongated drive shaft means having at least a portion thereof defining a torque tube for transmitting power to a machine, gearbox or the like from an appropriate power source;
    annular wall means projecting radially inwardly at axially spaced locations within the torque tube portion of the drive shaft means to define an integral, internal deaeration chamber directly within the drive shaft means remote from the machine;
    opposed port means located generally centrally of said axially spaced wall means defining means for ducting aerated liquid into the chamber at one axial end thereof and means for ducting separated air from the chamber at the oppsote axial end thereof;
    port means in outer walls of the torque tube portion of the drive shaft means between said axially spaced wall means for ducting deaerated liqid from the chamber; and
    conduit means extending axially through the drive shaft means in communication with said port means for delivering aerated liquid to the dearation chamber,
    whereby relatively rapid roation of the drive shaft means causes radial acceleration of the liquid in the deaeration chamber to effect radially outward separation of the liquid from the air under the influence of centrifugal force.

11. In a torque transmitting apparatus, deaerating means comprising drive shaft means at least a portion of which comprises a torque tube having tubular walls defining a deaeration chamber therewithin, said portion of the drive shaft means including a disconnect mechanism for separating said portion from the remainder of the drive shaft means, means for ducting aerated liquid into the deaeration chamber whereby relatively rapid rotation of the drive shaft means causes radial acceleration of the liquid to effect radially outward separation of the liquid from the air under the influence of centrifugal force, means located near an outer periphery of the chamber for ducting deaerated liquid therefrom, and means located inwardly of the periphery of the chamber for ducting separated air from the chamber.

12. A deaerating system in a torque transmitting, apparatus, comprising:
    drive shaft means having at least a portion thereof defining a torque tube;
    a disconnect mechanism for separating said portion of the drive shaft means from the remainder of the drive shaft means;
    annular wall means projecting radially inwardly at axially spaced locations within the torque tube portion of the drive shaft means to define an integral, internal deaeration chamber;
    opposed port means located generally centrally of said axially spaced wall means defining means for ducting aerated liquid into the chamber at one axial end thereof and means for ducting separated air from the chamber at the opposte axial end thereof;
    port means in outer walls of the torque tube portion of the drive shaft means between said axially spaced wall means for ducting deaerated liquid from the chamber; and
    conduit means extending axially through the drive shaft means in communication with said port means for delivering aerated liquid to the deaeration chamber,
    whereby relatively rapid rotation of the drive shaft means causes radial acceleration of the liquid in the deaeration chamber to effect radially outward separation of the liquid from the air under the influence of centrifugal force.

13. A deaerating torque tube, comprising means defining a deaeration chamber within a portion of the torque tube, a disconnect mechanism in said portion of the torque tube for separating said portion from the remainder of the torque tube, means for ducting aerated liquid to the deaeration chamber whereby relatively rapid rotation of the torque tube causes radial acceleration of the liquid to effect radial separation of the liquid from the air under the influence of centrifugal force, means located near an outer periphery of the chamber for ducting deaerated liquid therefrom, and means located inwardly of the periphery of the chamber for ducting separated air from the chamber.

* * * * *